United States Patent [19]
Goldsmith

[11] 4,436,246
[45] Mar. 13, 1984

[54] TRACTION DEVICES

[76] Inventor: David S. Goldsmith, 420 Park Ave., Highland Park, Ill. 60035

[21] Appl. No.: 35,920

[22] Filed: Aug. 3, 1979

[51] Int. Cl.³ .............................................. E01B 23/00
[52] U.S. Cl. ....................................................... 238/14
[58] Field of Search ....................... 238/14; D72/154; 152/208, 213 R, 223–230

[56] References Cited

U.S. PATENT DOCUMENTS 1,432,447 10/1922 Edgecomb ............................ 238/14
2,619,289 11/1952 Plante .................................... 238/14

FOREIGN PATENT DOCUMENTS 13944 of 1909 United Kingdom ............ 152/225 R

Primary Examiner—Randolph Reese

[57] ABSTRACT

A vehicle traction device adapted to provide a traction base for a drive wheel of an automotive vehicle, comprising in combination, a length of cylindrical pipe stock, metal washers. space and fastened at intervals along the length of this pipe stock in surrounding relation thereto, end portions of metal angle stock, the pipe stock intersecting with this angle stock generally at the convex surface centers and with the pipe and angle stock major axes at right angles to one another, these components being welded together so as to constitute a unitized whole.

1 Claim, 2 Drawing Figures

TRACTION DEVICES

The present invention is a traction device to serve as a traction base for a drive wheel of an automotive vehicle. The device is thrust between the vehicle tire and the road on a side where a drive wheel is slipping, and by establishing traction, makes it possible to drive a vehicle that had become stuck on ice or in the snow.

Of the 165-odd traction devices shown to date, more involve relatively large expense to provide, because they are not fabricated from common hardware elements. Others are less readily employed, being designed more for vehicle extraction from depressions and inclines. Still others are designed for use in mud, use common hardware elements only in large and costly numbers, or affect roadways in a manner disagreeable to municipal and state legislators. Still others have unnecessary moving parts, configurations that present structural weak-points, require costly tooling for needless shaping of finishing, lack sufficient strength, or are very heavy to transport in large numbers.

Accordingly, general objects of the present invention are to provide a traction device which is of simple, well-balanced construction and is economically fabricated on a mass production basis; is sturdy and durable, being capable of a long service life of severe use; is very simple to use; and is of relatively small size and weight for unobtrusive storage in the trunk compartment of an automobile.

Another object of the invention is to provide a traction device for use in potentially lethal temperatures which almost always works.

Yet another object of the present invention is to provide structural embodiments of the device which are readily fabricated and efficiently used.

Another object of the invention is to obtain a traction device which distributes and concentrates the forces involved so as to obtain the traction required without damaging roadways or rubber tires of the vehicle, without endangering bystanders, and to do so with a unitized or monolithic and virtually indestructible device of invention.

Other objects of the invention will in part be obvious and will in part appear hereinafter.

The invention accordingly comprises the features of construction, combination of elements and arrangement of parts, which will be exemplified in the construction hereinafter set forth, and the scope of the invention will be indicated in the claims.

For a fuller understanding of the nature and objects of the invention, reference should be had to the following detailed description taken in connection with the accompanying drawings, in which.

Figure 1:
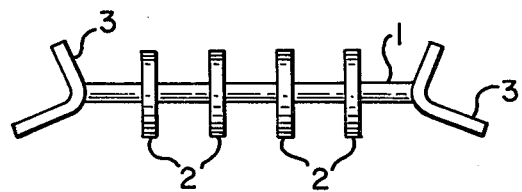
FIG. 1 is a side elevational view.
Figure 2:
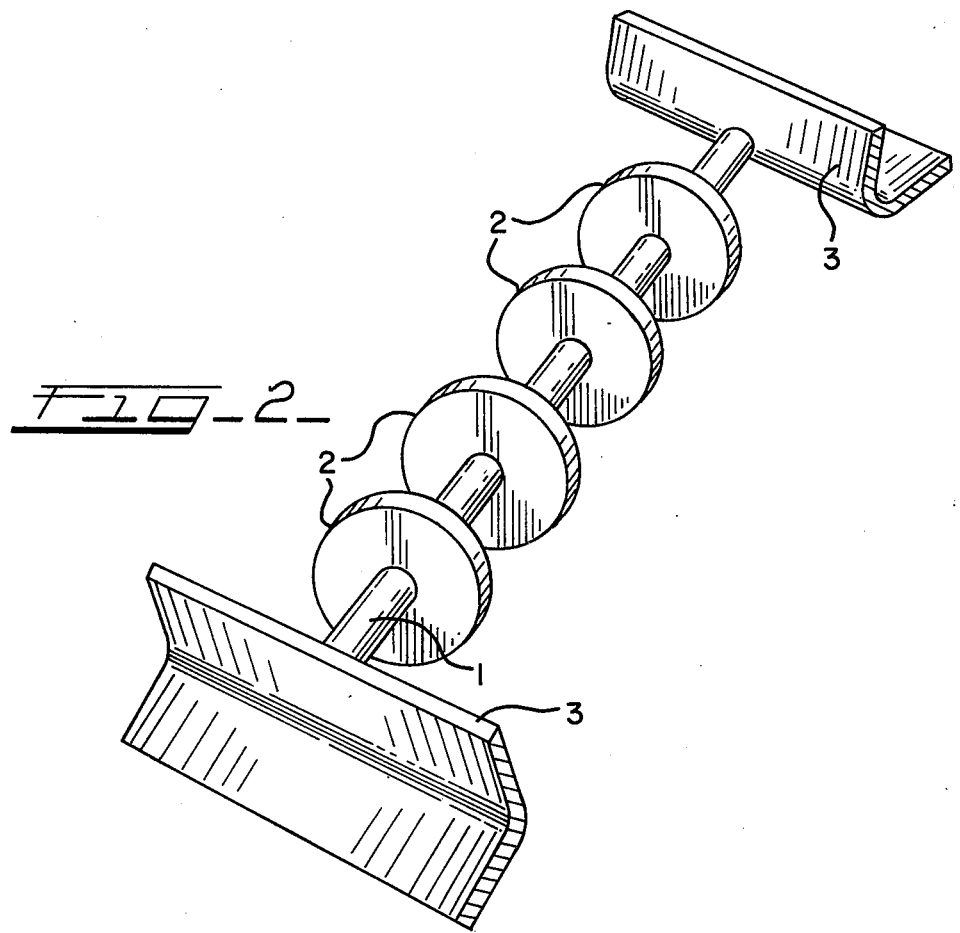
FIG. 2 is a perspective elevational view of an embodiment of the invention.

Referring to the drawings, in which like numerals identify similar parts throughout, it will be seen in FIGS. 1 and 2 that an embodiment of the invention may comprise a length of pipe or rod 1 which is preferably of steel for both strength and weldability. Spaced apart, along and about this pipe, are washers 2 preferably of steel for strength and weldability. These washers preferably have smaller overall outer diameter in relation to center-hole diameter and relatively greater thickness in relation to overall diameter than an average steel washer. To obtain the desirable thickness, it is possible to weld two washers or ordinary thickness close or directly beside one another. The pipe 1 is preferably $\frac{5}{8}$-inch stock and the washers 2 of $\frac{3}{8}$-inch side in a specimen for use with automobiles. This relationship provides washers the center-hole of which exactly fit about the pipe. The washers and pipe are permanently and immovably fastened together by means of welding. The number and size of the washers depends upon the overall length and size of the device in a given embodiment.

As best seen in FIG. 1, at either end of the pipe 1 is an end-portion of angle stock 3, preferably of steel for durability and weldability. Common right-angle steel stock may be used; these end-pieces 3 serve to prevent the end of the device away from the wheel from being tipped upward as the vehicle rolls onto the device. Also, the proximal end-piece so immediately and firmly engages the tire as to avert movement of the device away from the proper position or sudden displacement of the device in a manner potentially dangerous to bystanders; configured thus, the device is quite safe. Angle stock for use in the invention may be of other than right angle bend, and one of the sides or arms of the angle may be longer than the other. Right angle stock is the most common available and affords the opportunity to present the device to the public at the lowest possible cost. The washers 2 are spaced $1\frac{3}{4}$ to 2 inches apart, and the end-pieces 3 are generally the same distance from the closest washer as the washers 2 are distant from one another, considering the highest point of the end-piece 3 as that point in relation to which this measurement is taken. The embodiment shown in the accompanying drawings may be taken as about one foot in length overall and as having 4-inch end pieces.

Different sizes and lengths of the invention are contemplated in relation to different purchase prices, a longer embodiment carrying the vehicle to a farther distance from the point on the icy ground where the vehicle became struck or stalled due to a loss of traction, and proportionally larger embodiments being better suited to larger vehicles. Rustproof coating is used, as electrochemically deposited or as rust proof paint.

It will thus be seen that the objects set forth above, among those made apparent from the preceding description, are efficiently attained and, since certain changes may be made in the above construction and different embodiments of the invention could be made without departing from the scope thereof, it is intended that matter contained in the above description or shown in the accompanying drawings shall be interpreted as illustrative and not in a limiting sense.

It is also to be understood that the following claim is intended to cover all of the generic and specific features of the invention herein described, and all statements of the scope of the invention which, as a matter of language, might be said to fall therebetween.

Having described my invention, what I claim as new and desire to secure by Letters Patent is:

1. A traction device to serve as a traction base for a drive wheel of an automotive vehicle, comprising in combination, a length of ferrous metal straight stock, ferrous metal washers situated at points along the length of said straight stock in surrounding relation thereto, a section of ferrous metal angle stock, said straight stock intersecting with said angle stock generally at the center of said angle stock and at right angles thereto, said straight stock, angled stock, and washers being welded together so as to constitute a unitized whole.

* * * * *